United States Patent [19]

Tanaka et al.

[11] 3,952,425

[45] Apr. 27, 1976

[54] RESPONSE ANALYZER

[75] Inventors: Koich Tanaka, Soka; Genichi Tagata, Koshigaya; Kiyomi Abe, Noda, all of Japan

[73] Assignee: Pentel Kabushiki Kaisha, Japan

[22] Filed: Oct. 8, 1974

[21] Appl. No.: 513,052

[52] U.S. Cl. .................................. 35/48 R; 235/52
[51] Int. Cl.² ...................... G09B 5/00; G07C 13/00
[58] Field of Search .................. 235/52; 346/37, 49; 325/31; 340/286, 332; 179/2 AS; 35/35 C, 48 R; 324/77 B, 77 C, 77 CS

[56] References Cited
UNITED STATES PATENTS

| | | | |
|---|---|---|---|
| 3,416,243 | 12/1968 | Greenberg et al. | 35/48 R |
| 3,506,916 | 4/1970 | Mixsell et al. | 179/2 AS |
| 3,619,783 | 11/1971 | Ritter | 179/2 AS |
| 3,676,939 | 7/1972 | Oberst et al. | 35/48 R |
| 3,703,684 | 11/1972 | McVoy | 179/2 AS |

*Primary Examiner*—Kathleen H. Claffy
*Assistant Examiner*—George G. Stellar
*Attorney, Agent, or Firm*—Robert E. Burns; Emmanuel J. Lobato; Bruce L. Adams

[57] ABSTRACT

A response analyzer simultaneously receives multi-frequency signals transmitted from a plurality of answering devices and forms time divided pulses, which are counted to provide an indication of the number of answering devices which made responses. A plurality of AND gates are each associated with one of the multi-frequency signals, and operate to sample the time divided pulses in order to determine which of the answering devices made responses. Formation of time divided pulses from the simultaneously received multi-frequency signals takes place through mixing the respective multi-frequency signals with a local oscillator signal having a frequency which is continuously and periodically varied, to thereby convert the signals into their intermediate frequency versions, from which a fixed frequency component is extracted.

2 Claims, 9 Drawing Figures

RESPONSE ANALYZER

BACKGROUND OF THE INVENTION

The invention relates to a response analyzer, and more particularly to a response analyzer adapted for use in the totalization of votes, determination of educational effects and other applications.

The simplest way for an interrogator to see the choice made by answereres from a number of illustrative answers presented in connection with a question is to take a show of hands. This yields two kinds of information, namely, first, the number of answerers who have raised their hands for each particular answer or the proportion of such number against the total number of answerers, and secondly, the information concerning particular persons who raised their hands for each answer. In a certain voting situation, such as at a conference, it may be sufficient to know the number of the consenting party while in a lesson in the school it may be of importance to know which students have chosen a particular illustrative answer. In either instance, the process of a show of hands involves a psychological effect of certain answerers upon the remainder, which militates against the reliability of the result obtained. In addition, it requires an increased length of time for totalization where the response from a multitude of answerers is desired.

To overcome such difficulties there has been proposed an electrical voting apparatus, to substitute for a show of hands, which comprises a determination unit electrically connected with a plurality of answering devices allotted to each answerer, each including a selection switch so that the result of the operation of the respective switches by the answerers can be immediately totalized and displayed on the unit. Each answering device is allotted a given signal frequency, which, when transmitted therefrom, is discriminated by the determination unit. The demodulation of the multifrequency signals transmitted requires the provision of filters corresponding to the respective frequencies used on the part of the determination unit. However, where a large number of answerers is involved as contemplated herein, the provision of such filters is uneconomical, in particular when the signal transmitted is only two-valued. Another proposal uses a rotary variable capaciter in a tuning circuit so that the tuned frequency may be swept over a range of frequencies covering the whole frequency of the multi-frequency signals. However, there must be a signal switching circuit which is electrically connected with the output of the tuning circuit and rotated in synchronism with the rotation of the variable capacitor. The switching circuit involves the use of mechanical contacts, which is disadvantageous.

SUMMARY OF INVENTION

Therefore, it is an object of the invention to provide a response analyzer capable of receiving multi-frequency signals transmitted from a plurality of answering devices having different oscillation frequencies and performing an analyzing operation on each individual signal without using mechanical contacts.

It is another object of the invention to provide such a response analyzer which is simple in construction and inexpensive to manufacture.

In accordance with the invention, all of the multi-frequency signals transmitted by the answering devices are received simultaneously, and are subjected to a time division process to form a train of time divided pulses, which are counted to provide an indication of the number of answering devices which transmit their signals. Alternatively, a discrimination can be made of the oscillation frequencies to indicate which answering devices have responded.

A train of time divided pulses is formed by mixing the simultaneously received multi-frequency signals with a local oscillator signal having a frequency which is continuously and periodically varied, thereby converting these signal into their intermediate frequency versions. The mixing of mutually different received frequencies with the common local oscillator frequency which is being swept will yield a fixed frequency component in the intermediate frequency versions which appears at different times. The extraction of the fixed frequency component provides a time divided, received signal. The local oscillator is responsive to an output of a sweep generator which is reset by a reference pulse.

The analysis of the time divided pulses to discriminate the frequency or answering device indicative of a particular time divided pulse takes place by forming a logical product of the time divided pulse and a sampling pulse, which has the same period as the reference pulse but is displaced therefrom by an amount of time which depends on the particular oscillation frequency corresponding to the time divided pulse that is to be sampled.

The above and other objects and features of the invention will be better understood from the following detailed description of an embodiment thereof when taken together with the illustration in the attached drawings, in which.

DETAILED DESCRIPTION OF AN EMBODIMENT

Figure 1:
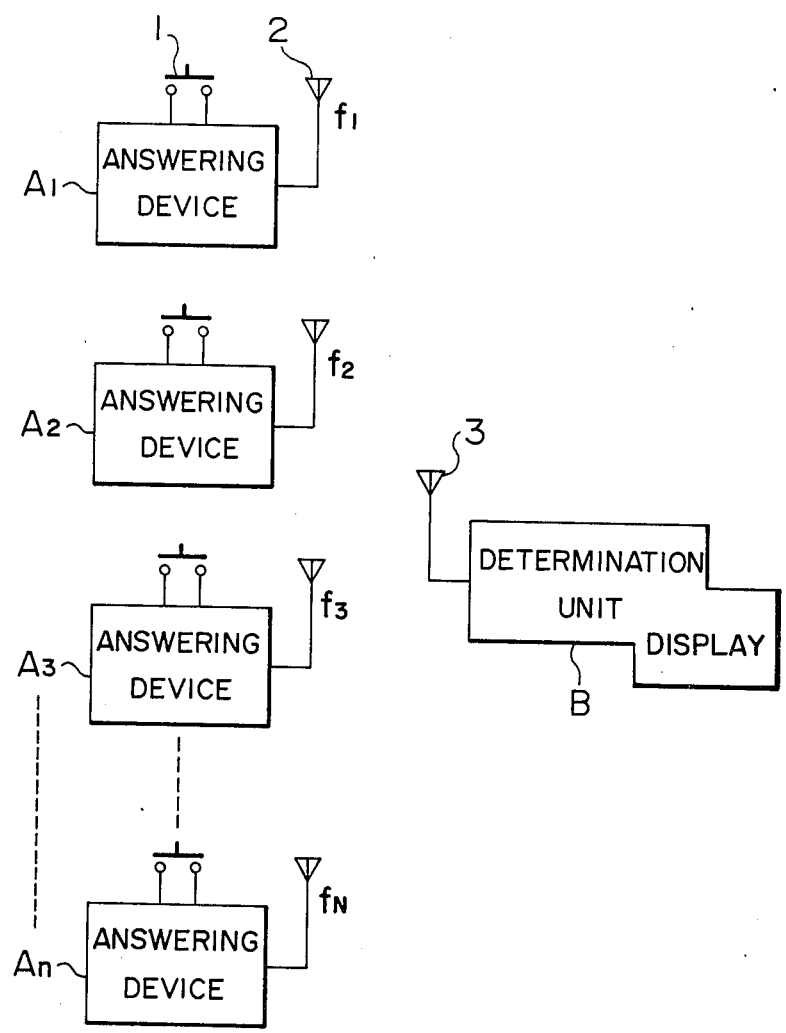
FIG. 1 is a schematic view illustrating the principle of the invention.

Referring to FIG. 1, there are shown a plurality of answering devices $A_1$, $A_2$, $A_3$ . . . , $A_n$ each associated with a switch 1 which may be turned on to transmit a continuous wave response signal from an associated antenna 2. The response signals transmitted from the answering devices $A_1$ to $A_n$ are of different frequencies $F_1$, $F_2$, $F_3$ . . . $F_n$, respectively. A determination unit B receives these response signals and provides a visible display of the responses made by the answering devices.

Figure 2:
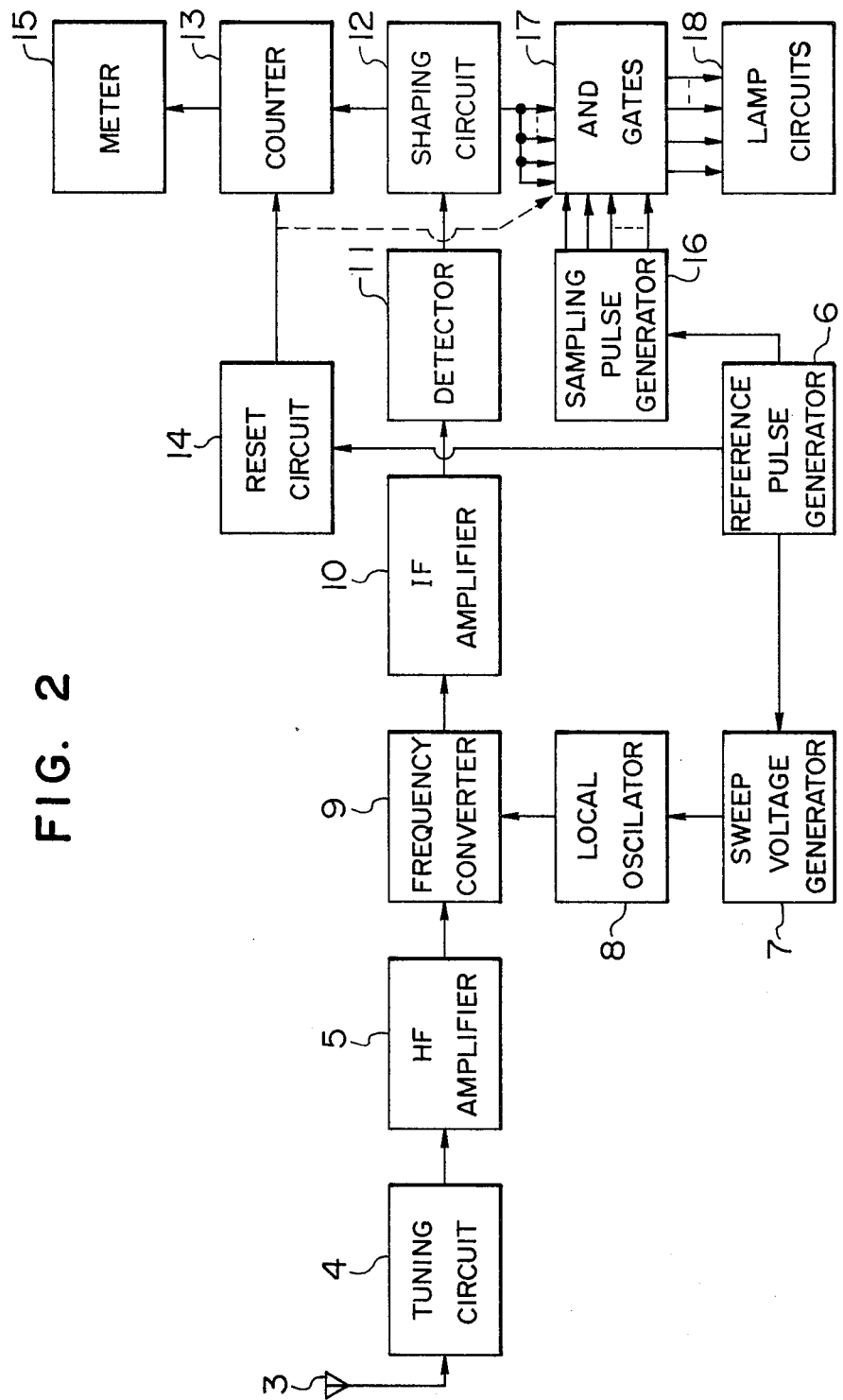
FIG. 2 is a block diagram of the response analyzer according to one embodiment of the invention.
Figure 3:
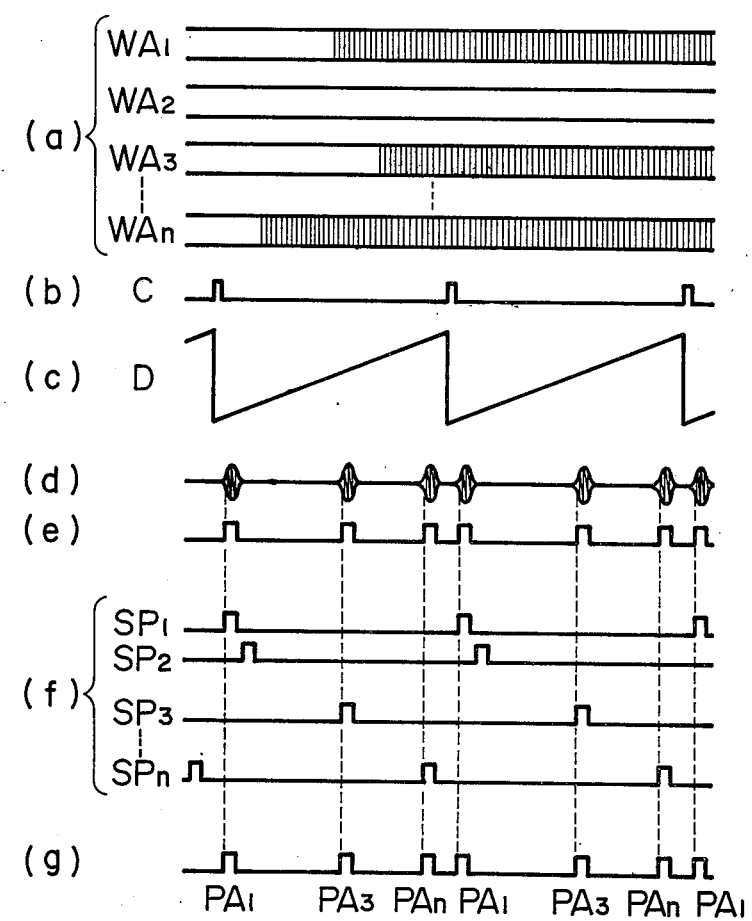
FIGS. 3 ($a$) to 3 ($g$) show graphically the waveforms of various signal appearing in the analyzer shown in FIG. 2.

Referring to FIG. 2, the determination unit B includes a receiving antenna 3 for receiving response signals $WA_1$, $WA_2$, $WA_3$ . . . $WA_n$ (see FIG. 3 ($a$)) having respective frequencies $F_1$, $F_2$, $F_3$ . . . $F_n$ which are transmitted by the plurality of answering divices as shown in FIG. 1. In FIG. 3 ($a$), no waveform is shown for the response signal $WA_2$, which indicates that the answering device $A_2$ has not made a response. The receiving antenna 3 is connected with a tuning circuit 4 which is tuned with a frequency range covering the respective frequencies of the response signals. These response signals are amplified by a high frequency amplifier 5 before being applied to a frequency converter 9.

There is provided a reference gate pulse generator 6 for producing a gate pulse C (see FIG. 3 (b)) which triggers a sweep voltage generator 7 so as to produce a sweep voltage D (see FIG. 3 (c)) repeatedly. The sweep voltage operates on a voltage-controlled local oscillator 8 so as to produce an oscillation frequency which varies continuously and periodically between $f_1$ and $f_n$. The oscillation frequency is supplied to the frequency converter 9 for mixing with the response signals $WA_1$ to $WA_n$. As a result, the frequency converter 9 produces intermediate frequency signals having frequencies which represent the difference between the local oscillator frequency (varying from $f_1$ to $f_n$) and the response signal frequencies. These intermediate frequency signals are amplified and analyzed by an intermediate frequency amplifier 10 which functions to analyze the respective response signals $WA_1$, to $WA_n$ in turn by being tuned to a fixed frequency $f_k$. Assuming that $f_1 < f_n$ and $F_1 < F_n$, the arrangement is designed such that $(f_1 - F_1) \leq f_k \leq (f_n - F_n)$. Consequently, it will be seen that by being mixed with the local oscillator frequency which varies repeatedly from $f_1$ to $f_n$, each of the continuous wave response signals will be converted to the intermediate frequency of $f_k$ once in a single period and at a mutually different point in time.

Thus a plurality of response signals as shown in FIG. 3 (d) will appear at the output of the IF amplifier 10, these signals being displaced in time from each other. These output signals are detected by a detector 11 and shaped by a shaper 12 to a pulse wave form as illustrated in FIG. 3 (e). These shaped pulses are counted by a counter 13, which is reset after each period of the reference pulse generator 6 by a reset pulse produced by a reset circuit 14 in response to the gate pulse C supplied thereto from the generator 6. The count contained in the counter 13 before it is reset is supplied to an indicating meter 15 for displaying the number of responses or its proportion against the total number of the answering devices.

In order to enable an analysis of the response of each individual answering device, there is provided a sampling pulse generator 16 which produces n sampling pulses $SP_1, SP_2, SP_3 \ldots SP_n$ at an equal interval during each period initiated by a gate pulse from the generator 6 and in time coincidence with the respective analyzed and shaped response signals, as indicated in FIG. 3 (f). A determination circuit 17 includes a plurality of AND gates, each of which receives a shaped response signal from the shaper 12 and a sampling pulse from the generator 16 to form a logical product thereof, which is fed to one of a plurality of lamps contained in an indicator lamp circuit 18. Thus if a particular answerer responds by closing the switch 1 on his answering device, a corresponding lamp in the circuit 18 is illuminated. In the above example, it is assumed that the answering device $A_2$ makes no response, so that the lamp corresponding thereto is not illuminated. This permits a recognition of the response of individual answerers. It is possible to make a correction when a certain answerer inadvertently closed the switch, by supplying the reset pulse from the reset circuit 14 to the determination circuit 17 so that the corresponding lamp may be extinguished at the end of each sweep period.

In this manner, a good separation between the response signals is achieved, improving the accuracy of information obtained.

Having described the invention, what is claimed is:

1. A response analyzing system comprising, in combination:

a plurality of answering devices each comprising, a transmitter operable for transmitting a continuous wave response signal, and means for operating said transmitter to transmit or not transmit the response signal in response to a question asked, wherein the transmitters all develop response signals having mutually different frequencies; and a determination unit comprising, a tuned circuit for receiving the response signals developed by said plurality of answering devices and having a bandwidth sufficient to pass all the received response signals, a reference pulse generator for developing a train of periodic reference pulses, a sweep voltage generator responsive to the periodic reference pulses for developing a periodic time-varying sweep voltage having a period synchronized with the period of the reference pulses, a voltage-controlled local oscillator receptive of and controlled by the time-varying sweep voltage for developing a local oscillator signal having a continuously and periodically varying frequency which varies with a period synchronized with the period of the reference pulses, a frequency converter receptive of the response signals and the local oscillator signal for developing a plurality of intermediate frequency signals each having a periodically time-varying frequency and each corresponding to a respective one of the received continuous wave response signals passed by said tuned circuit, a narrow band frequency-selective circuit receptive of the plurality of intermediate frequency signals for passing segments of respective ones of the intermediate frequency signals for periods of time in which the respective ones of the intermediate frequency signals are within the passband of said frequency selective circuit, pulse generating means responsive to the segments of the respective ones of the intermediate frequency signals passed through said frequency-selective circuit for developing a pulse during each occurrence of each respective segment of the intermediate frequency signals passed through said frequency selective circuit, a sampling pulse generator responsive to the periodic pulses for developing a sequence of sampling pulses each corresponding to a different one of the response signals and each occurring when the intermediate frequency signal which corresponds to the corresponding response signal is within the passband of said frequency-selective circuit, a plurality of AND gates each recepetive of a respective pulse of the sequence of sampling pulses and all receptive of the pulses developed by said pulse generating means whereby one of said AND gates develops an output signal upon the simultaneous occurrence of a pulse developed by said pulse generating means and a pulse developed by said sampling pulse generator, and a plurality of indicators each responsive to the output of a respective one of said AND gates for indicating when the respective one of said AND gates develops an output, whereby each of said indicators corresponds to a different one of the response signals and is effective to indicate when the corresponding response signal has been received.

2. A response analyzing system according to claim 1, further comprising: a counter for counting the number of pulses generated by said pulse generating means; means for periodically resetting said counter in synchronism with the periodic reference pulses; and means for displaying the count stored in said counter, whereby the maximum count stored in said counter and displayed by said means for displaying is equal to the number of received response signals developed by said plurality of answering devices.

* * * * *